(12) United States Patent
Lee et al.

(10) Patent No.: US 10,161,558 B2
(45) Date of Patent: Dec. 25, 2018

(54) LIFTING DEVICE

(71) Applicant: SYNCMOLD ENTERPRISE CORP., New Taipei (TW)

(72) Inventors: Yuan-Chi Lee, New Taipei (TW); Ko-Hsien Lee, New Taipei (TW)

(73) Assignee: SYNCMOLD ENTERPRISE CORP., New Taipei (TW)

( * ) Notice: Subject to any disclaimer, the term of this patent is extended or adjusted under 35 U.S.C. 154(b) by 0 days.

(21) Appl. No.: 15/450,646

(22) Filed: Mar. 6, 2017

(65) Prior Publication Data

US 2017/0261150 A1  Sep. 14, 2017

Related U.S. Application Data

(60) Provisional application No. 62/305,091, filed on Mar. 8, 2016.

(51) Int. Cl.
*F16M 11/04* (2006.01)

(52) U.S. Cl.
CPC ..... *F16M 11/046* (2013.01); *F16M 2200/047* (2013.01); *F16M 2200/08* (2013.01)

(58) Field of Classification Search
CPC ............. Y10S 248/917; Y10S 248/919; Y10S 248/92; Y10S 248/924; F16M 11/043; F16M 11/046; F16M 11/22; F16M 2200/025; F16M 2200/027; F16M 2200/047; F16M 2200/048; F16M 2200/08
USPC ........ 248/917, 919, 920, 924, 122.1, 123.11, 248/125.1, 125.2, 295.11, 297.11, 297.21
See application file for complete search history.

(56) References Cited

U.S. PATENT DOCUMENTS

| | | | | |
|---|---|---|---|---|
| 2,168,209 A | * | 8/1939 | Haupt | A61B 6/447 248/572 |
| 3,575,368 A | * | 4/1971 | Thomas | A61B 6/447 248/572 |
| 3,905,311 A | * | 9/1975 | Carpentier | A47B 9/02 108/136 |
| 4,705,447 A | * | 11/1987 | Smith | B23Q 1/48 269/71 |
| 7,621,490 B2 | * | 11/2009 | Tseng | F16M 11/046 248/157 |
| 7,644,897 B2 | * | 1/2010 | Shin | F16M 11/105 248/176.1 |
| 7,793,898 B2 | * | 9/2010 | Dong | F16M 11/105 248/157 |
| 7,854,417 B2 | * | 12/2010 | Gan | F16M 11/24 248/122.1 |
| 9,046,213 B2 | * | 6/2015 | Huang | F16M 11/046 |
| 9,046,214 B2 | * | 6/2015 | Chang | F16M 11/046 |
| 9,091,393 B2 | * | 7/2015 | Huang | F16M 11/046 |
| 9,222,616 B2 | * | 12/2015 | Ergun | F16M 11/10 |
| 9,718,659 B2 | * | 8/2017 | Huang | B66F 9/06 |

(Continued)

FOREIGN PATENT DOCUMENTS

TW  M 482023 U  7/2014

*Primary Examiner* — Jonathan Liu
*Assistant Examiner* — Guang H Guan
(74) *Attorney, Agent, or Firm* — Muncy, Geissler, Olds & Lowe, P.C.

(57) ABSTRACT

A lifting device for holding a display is provided. The lifting device has a slim appearance, wherein a width of a frame of the lifting device is 5-30 mm. The lifting device holds the display on a working surface through a plurality of constant force springs.

11 Claims, 5 Drawing Sheets

(56) References Cited

U.S. PATENT DOCUMENTS 9,915,394 B2 * 3/2018 Chen ...................... F16M 11/28
2017/0261150 A1 * 9/2017 Lee ...................... F16M 11/046

* cited by examiner

LIFTING DEVICE

CROSS REFERENCE TO RELATED APPLICATION

This application claims the benefits of the U.S. Provisional Application Ser. No. 62/305,091, filed on Mar. 8, 2016. The entirety of said Provisional Application is incorporated herein by reference.

BACKGROUND OF THE INVENTION

1. Field of the Invention

The present invention relates to a lifting device, and more particularly, to a lifting device with an ultra-slim appearance.

2. Description of Related Art

A lifting device as disclosed in Taiwan Utility Patent No. M482023 is composed of a supporting frame, a limiting base, a bearing base, a plurality of fixing parts, a plurality of constant force parts, a slider, and a sliding slot. The lifting device occupies a large width laterally because the constant force parts are disposed side by side with rails disposed at both sides of the constant force parts. Therefore, it is difficult to meet the desire of slim appearance.

Therefore, the present invention provides a novel lifting device having a slimmer structure which is desirable and has potential in this industry.

SUMMARY OF THE INVENTION

The object of the present invention is to provide a lifting device for holding a display. The lifting device has a slimmer structure and provides the force for holding the display on a working surface through a plurality of constant force springs.

To achieve the abovementioned objects, the present invention provides a lifting device for holding a display on a working surface. The lifting device comprises: a base; a frame disposed on the base and having two opposite side plates; a loading slider slidably disposed between the side plates of the frame, and a portion of the loading slider extending outside the frame for connecting the display; a slide rail disposed between the side plates; a sliding member slidably disposed on the slide rail and spaced apart from the loading slider; a pulley rotatably disposed between the side plates of the frame; and a rope having a first end fastened to the loading slider and a second end fastened to the sliding member with the rope steering through the pulley, wherein the rope distributed between the loading slider and the top of the pulley has a length of L1, and distributed between the sliding member and the top of the pulley has a length of L2; and at least one constant force spring disposed between the side plates of the frame and each of the at least one constant force spring has a free end connecting to the sliding member to constantly provide an elastic force to the display, wherein a direction parallel to an axis of each of the at least one constant force spring is defined as X direction and a direction parallel to the base and perpendicular to the X direction is defined as Y direction; wherein the slide rail is formed on an inner surface of one of the side plates, and the sliding member has a recess portion which is engaged with the slide rail and slidable along the slide rail; the sliding member is spaced apart from the loading slider along the Y direction, and the loading slider is able to stop at any location between a highest position and a lowest position. When the loading slider is located at the highest position, L1 has a minimum value and L2 has a maximum value. When the loading slider is located at the lowest position, L1 has a maximum value, and L2 has a minimum value.

In one embodiment of the present invention, the slide rail is disposed between the sliding member and the loading slider, the pulley is disposed above the slide rail and the rope partially surrounds the pulley so that the loading slider and the sliding member are linked together, and slidable in opposite directions so as to change values of L1 and L2.

In one embodiment of the present invention, the frame further includes a guiding rail which is formed on the inner surface of the one of the side plates, and the loading slider abuts against and slidable along the guiding rail. The loading slider includes a thin plate and two friction blocks disposed at opposite sides of the thin plate to contact with the thin plate to provide a friction.

In one embodiment of the present invention, the at least one constant force spring includes three constant force springs, and the free ends of the three constant force springs overlap each other and are fixed to the sliding member.

Accordingly, when the loading slider slides from the highest position to the lowest position, the loading slider provides a pull-down force to the rope fastened thereto, and the rope generates a pull-up force to the sliding member so that the sliding member moves upwardly and stretches the free end of each of the at least one constant force spring. When the loading slider slides from the lowest position to the highest position, the at least one constant force spring pulls the sliding member so that the sliding member provides a pull-down force to the rope fastened thereto.

In one embodiment, the lifting device further comprises an upper stop block which is disposed in the frame, adjacent to an upper end of the slide rail and lower than the pulley to abut against the loading slider. Also, the lifting device further comprises a lower stop block which is disposed in the frame and adjacent to a lower end of the slide rail to abut against the loading slider.

In one embodiment of the present invention, the pulley has a guiding groove for the rope passing through.

In one embodiment of the present invention, a width of the frame parallel to the X direction has a value in a range from 5 mm to 30 mm.

The lifting device provided by the present invention is characterized in a simple, small, and slim structure which meets the requirements of simple structure demanded by the users. Also, the lifting device provides sufficient support for the display and has lifting functions.

The detailed technology and preferred embodiments implemented for the subject invention are described in the following paragraphs accompanying the appended drawings for people skilled in this field to well appreciate the features of the claimed invention.

DETAILED DESCRIPTION OF THE PREFERRED EMBODIMENT

Hereafter, examples will be provided to illustrate the embodiments of the present invention. Advantages and effects of the invention will become more apparent from the disclosure of the present invention. It should be noted that these accompanying figures are simplified and illustrative. The quantity, shape, and size of components shown in the figures may be modified according to practical conditions, and the arrangement of components may be more complex. Other various aspects also may be practiced or applied in the invention, and various modifications and variations can be made without departing from the spirit of the invention based on various concepts and applications.

Embodiment 1

Figure 1:
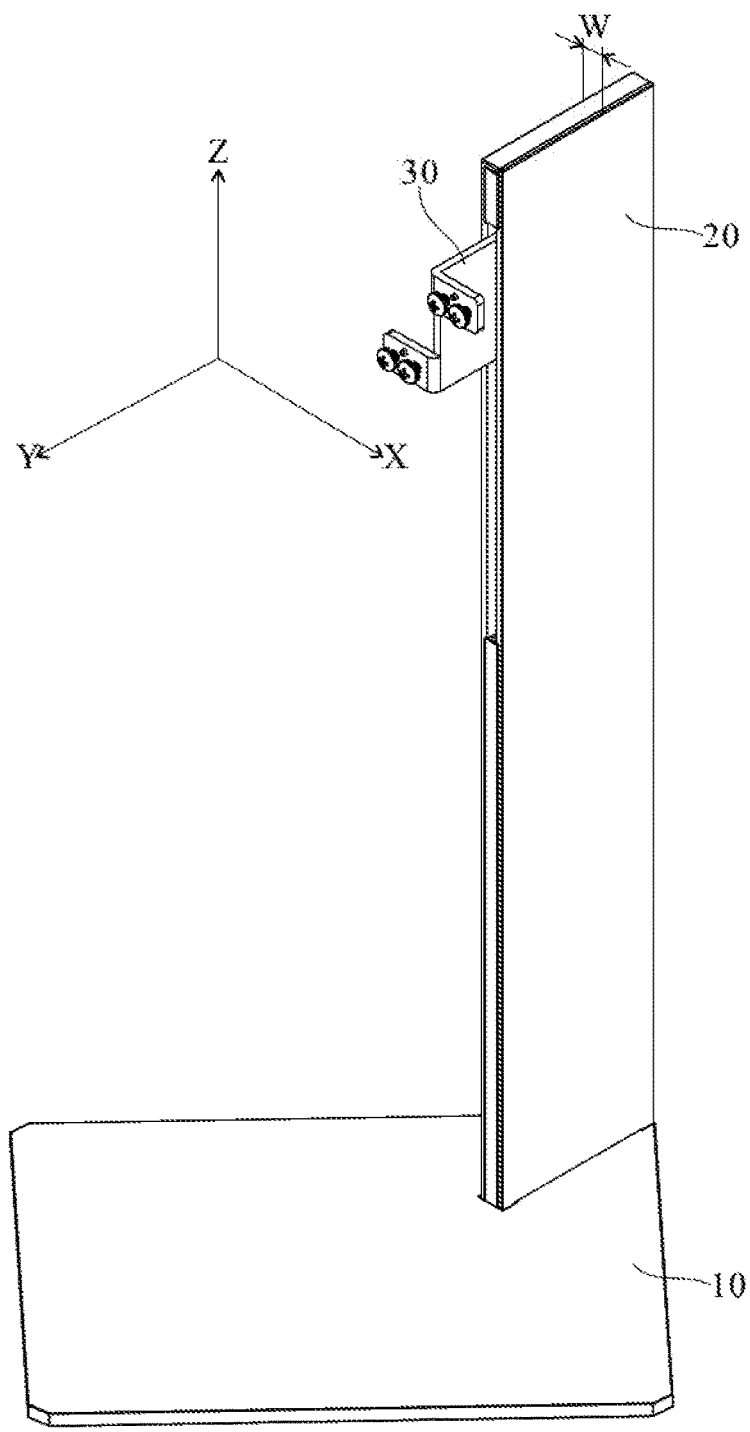
FIG. 1 is a perspective view of the lifting device of one preferred embodiment of the present invention.
Figure 2:
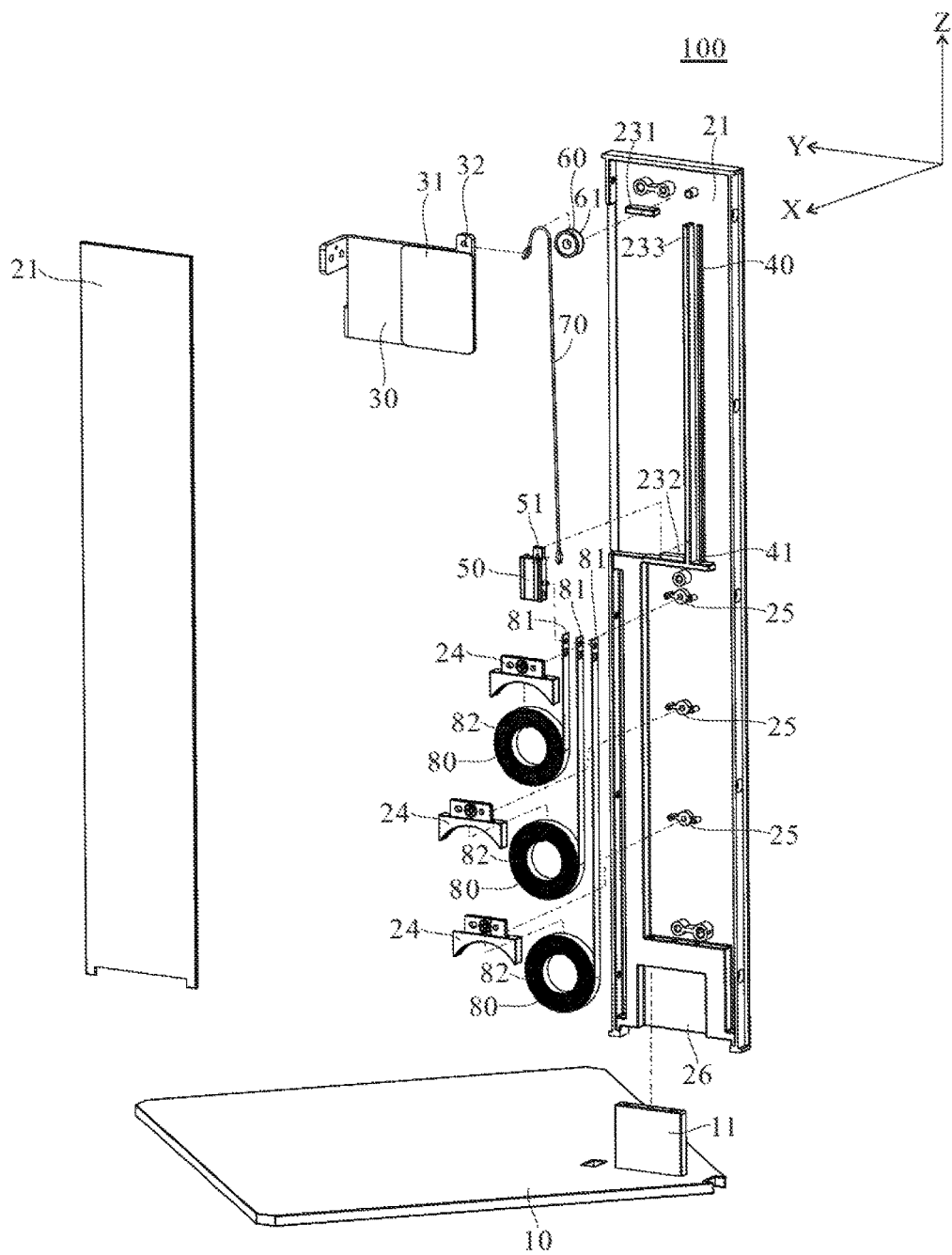
FIG. 2 is an explosion view of one preferred embodiment of the present invention.

Please refer to FIG. 1 and FIG. 2, FIG. 1 is a perspective view of the lifting device of a preferred embodiment of the present invention, and FIG. 2 is an explosion view of the lifting device of a preferred embodiment of the present invention. The illustrated lifting device 100 is utilized to carry a display on a working surface and mainly comprises a base 10, a frame 20, a loading slider 30, a slide rail 40, a sliding member 50, a pulley 60, a rope 70, and three constant force springs 80.

The frame 20 is disposed on the base 10, wherein the base 10 has an engaging protrusion 11 engaging to an engaging notch 26 of the frame 20. The frame 20 includes two opposite side plates 21 perpendicularly disposed on the base 10. The loading slider 30, the slide rail 40, the sliding member 50, the pulley 60, the rope 70, and the constant force springs 80 are received between the side plates 21.

As illustrated in FIG. 1 and FIG. 2, the axial direction of the constant force springs 80 is defined as direction X, the radial direction of the constant force springs 80, parallel to the working surface, is defined as direction Y, and the direction perpendicular to the working surface is defined as direction Z. In one preferred embodiment of the present invention, the width W of the frame 20 along the X direction may have a value in a range from 5 mm to 30 mm.

Figure 3:
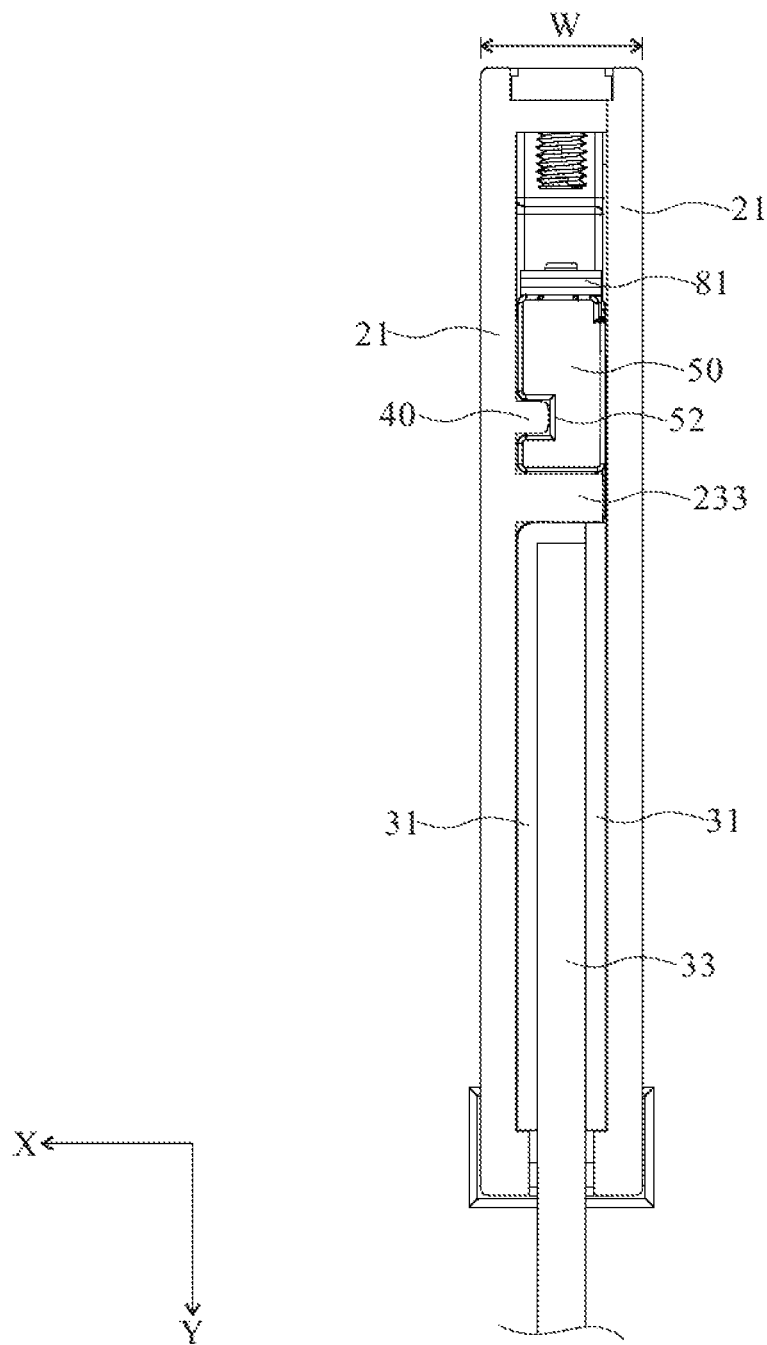
FIG. 3 is a top view of one preferred embodiment of the present invention.

Particularly, the top view of the frame 20 along the Z direction is shown in FIG. 3. A guiding rail 233 and the slide rail 40 are formed on an inner surface of one of the side plates 21, and a rear end of the loading slider 30 abuts against the guiding rail 233 so that the loading slider 30 may slide up and down. The sliding member 50 has a recess portion 52 engaging with the slide rail 40, so that the sliding member 50 may slide up and down along the slide rail 40. In addition, the loading slider 30 is slidably disposed between the side plates 21, and a portion of the loading slider 30 extends outside the frame 20 to connect to the display.

Furthermore, the loading slider 30 includes a thin plate 33 and two friction blocks 31. The friction blocks 31 are disposed on two sides of the thin plate 33 and contact with the side plates 21 of the frame 20 to provide a friction for maintaining the loading slider 30 at a desired height. One end of the rope 70 is fastened to the loading slider 30 while the other end of the rope 70 is fastened to the sliding member 50. More specifically, the upper end of the loading slider 30 includes a first hole 32, and the sliding member 50 includes a second hole 51. The rope 70 passes through the first hole 32 and the second hole 51 respectively and is fastened thereto. The slide rail 40 is disposed between the side plates 21 of the frame 20 and adjacent to the guiding rail 233, and the sliding member 50 is slidably disposed on the slide rail 40 and slides up and down along the slide rail 40. In addition, the rope 70 changes its extending direction through the pulley 60, wherein the pulley 60 has a guiding groove 61 for the rope to pass through. Therefore, the loading slider 30 and the sliding member 50 are linked to each other, slide toward opposite directions, and change the distribution of the rope 70 on both sides of the pulley 60.

In addition, three constant force springs 80 are disposed beneath the slide rail 40, and each of the constant force springs 80 includes a free end 81 and a winding body 82. Three free ends 81 are connected to the sliding member 50 to constantly provide the elastic force. Three holding members 24 are fixed to one side plate 21 of the frame 20 by three fixing members 25 for accommodating the constant force springs 80 respectively so that the winding bodies 82 of the constant force springs 80 are rotatably (rotate about an axis parallel to the X direction) held on the holding members 24.

According to the aforementioned configuration, the constant force springs 80 constantly provide the pull-down force. The pull-down force is redirected by the rope 70 and the pulley 60 and then generates the pull-up force to the loading slider 30. The pull-up force and the weight of the loading slider 30 and the display are balanced. Further, with the friction provided by the friction blocks 31 on both sides of the loading slider 30, the loading slider 30 and the display may stop at any location between the highest position and the lowest position.

Figure 4:
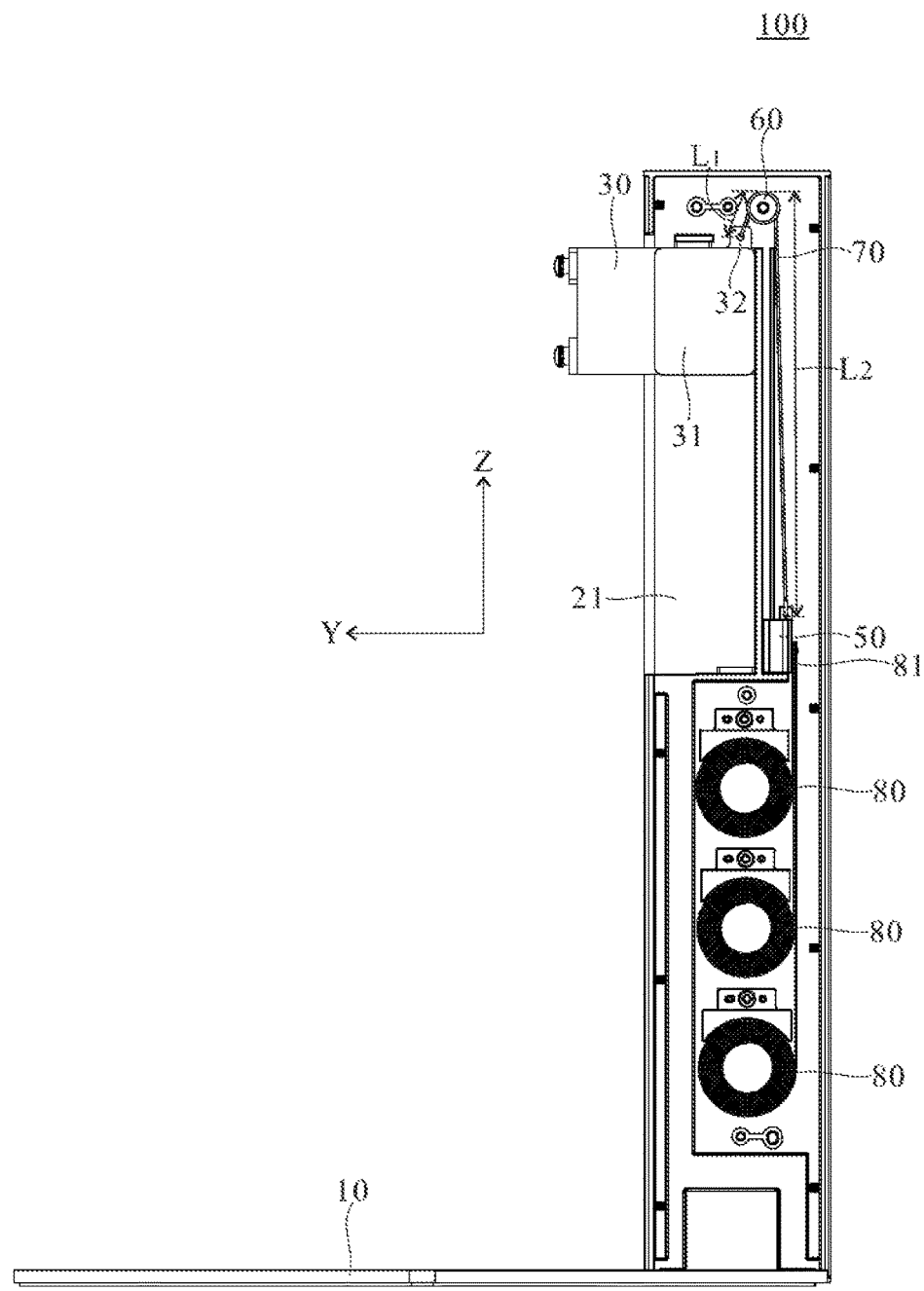
FIG. 4 is an operative view of one preferred embodiment of the present invention.

Please refer to FIG. 4, which illustrates the case when the loading slider 30 stops at the highest location. More specifically, in this case, the loading slider 30 abuts against an upper stop block 231, the sliding member 50 locates at a lower end 41 of the slide rail 40, three free ends 81 of three constant force springs 80 also locate at the lowest position, and the force provided by the constant force springs 80 is redirected through the sliding member 50, the rope 70, and the pulley 60 so that a portion of the rope 70, which is fastened to the loading slider 30 and on the same side with the loading slider 30, provides a pull-up force to the loading slider 30. Accordingly, the loading slider 30 and the display equipped thereon may stop at the highest position. In other words, the balance is achieved and the lifting device remains motionless in the absence of any external force. Also, in the meantime; the rope 70 distributed between the loading slider 30 and the top of the pulley 60 has a length L1 with a minimum value, and the rope 70 distributed between the sliding member 50 and the top of the pulley 60 has a length L2 with a maximum value.

Figure 5:
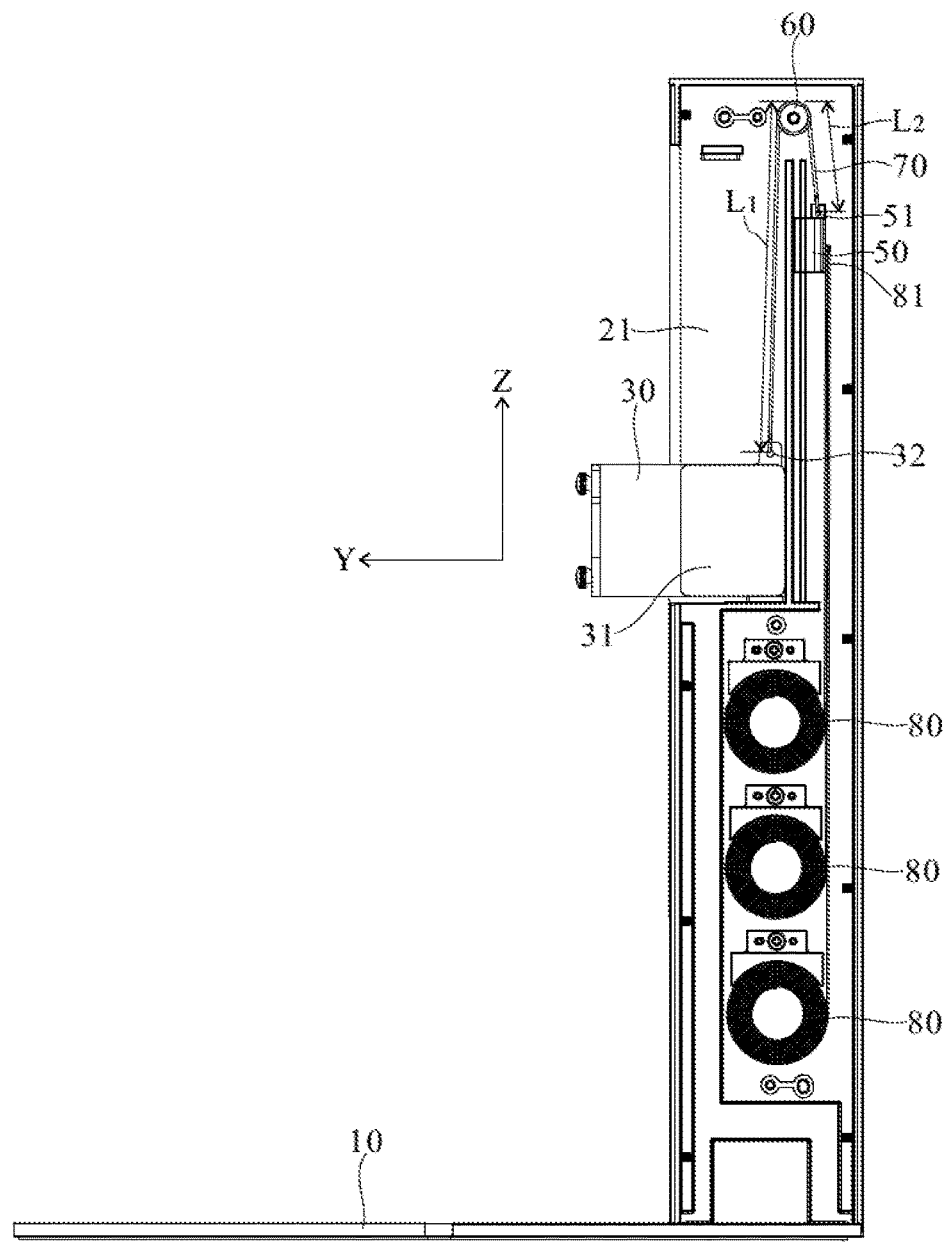
FIG. 5 is an operative view of one preferred embodiment of the present invention.

Please refer to FIG. 5, which illustrated the case when the loading slider 30 is located at the lowest position. Specifically, in this case, the loading slider 30 abuts against the lower stop block 232, the sliding member 50 locates at the highest position of the slide rail 40, and the free ends 81 of three constant force springs 80 are also located at the highest position. Similarly, the balance is achieved and the lifting device remains motionless in the absence of any external force. Also, the length L1 of the rope 70 distributed between the loading slider 30 and the top of the pulley 60 has a maximum value, and the length L2 of the rope 70 distributed between the sliding member 50 and the top of the pulley 60 has a minimum value.

The following description relates to the operations between each element when the display is adjusted from its highest position to its lowest position. When a user is adjusting the position of the display (equipped with the loading slider 30) from its highest position to its lowest position, the user must provide a downward external force to break the balance, which makes the lifting device motionless, and force the loading slider 30 to move downwardly. The loading slider 30 generates a pull-down force to the rope 70, and the pull-down force is redirected by the rope 70 and the pulley 60 to pull the sliding member 50 to move upwardly. At the meantime, the free ends 81 of the constant force springs 80 are stretched to move upwardly. When the external force is removed, the elastic force provided by the constant force springs 80, the friction provided by the friction blocks 31, and the total weight of the loading slider 30 and the display (not shown in figures) achieve balance again. Therefore, the loading slider 30 and the display may stop at any positions or at the lowest position.

On the contrary, when adjusting the display from its lowest position to the highest position, an upward external force must be provided to break the force balance of the lifting device and to move the loading slider 30 upwardly. At this moment, the free ends 81 of the constant force springs 80 may move downwardly and pull the sliding member 50 downwardly. Further, the sliding member 50 provides a pull-down force to the rope 70 fastened thereto and changes the distribution of the rope 70 on both sides of the pulley 60. Similarly, when the external force is removed, the forces achieve balance again, and the loading slider 30 and the display may stop at any positions or at the highest position.

More specifically, the relative movements of the loading slider 30 and the sliding member 50 change the length distributions of L1 and L2 of the rope 70 on both sides of the pulley 60. However, the sum of L1 and L2 is a constant value.

In addition, the number of the constant force springs 80 is not limited to three but may be one or four constant force springs. In the present invention, if the number of the constant force spring is more than one, the constant force springs should be stacked along the Z direction due to the consideration of achieving a slim configuration.

The lifting device provided by the present invention has simplified structure and slim exterior with the frame thickness 5-30 mm. The height of the display may also be adjusted by the user. Therefore, a new option is provided to the users to meet the requirements of slim lifting device.

Although the present invention has been explained in relation to its preferred embodiment, it is to be understood that many other possible modifications and variations can be made without departing from the spirit and scope of the invention as hereinafter claimed.

What is claimed is:

1. A lifting device used for holding a display on a working surface, the lifting device comprising:
   a base;
   a frame disposed on the base and having two opposite side plates;
   a loading slider slidably disposed between the side plates of the frame, and a portion of the loading slider extending outside the frame for connecting the display;
   a slide rail disposed between the side plates of the frame;
   a sliding member slidably disposed on the slide rail and spaced apart from the loading slider;
   a pulley rotatably disposed between the side plates of the frame;
   a rope steering through the pulley and having a first end fastened to the loading slider and a second end fastened to the sliding member, wherein a part of the rope distributed between the loading slider and a top of the pulley has a length of L1, and a part of the rope distributed between the sliding member and the top of the pulley has a length of L2; and
   at least one constant force spring disposed between the side plates of the frame, and each of the at least one constant force spring having a free end connecting to the sliding member to constantly provide an elastic force to the display, wherein a direction parallel to an axis of each of the at least one constant force spring is defined as X direction, and a direction parallel to the base and perpendicular to the X direction is defined as Y direction;
   wherein, the slide rail is formed on an inner surface of one of the side plates, and the sliding member has a recess portion which is engaged with the slide rail and slidable along the slide rail; the sliding member is spaced apart from the loading slider along the Y direction, and the loading slider is able to stop at any location between a highest position and a lowest position;
   when the loading slider is located at the highest position, L1 has a minimum value, and L2 has a maximum value; when the loading slider is located at the lowest position, L1 has a maximum value, and L2 has a minimum value.

2. The lifting device as claimed in claim 1, wherein the slide rail is disposed between the sliding member and the loading slider, the pulley is disposed above the slide rail, and the rope partially surrounds the pulley so that the loading slider and the sliding member are linked together and slidable in opposite directions so as to change values of L1 and L2.

3. The lifting device as claimed in claim 1, wherein the frame further includes a guiding rail which is forming on the inner surface of the one of the side plates and the loading slider abuts against and is slidable along the guiding rail.

4. The lifting device as claimed in claim 3, wherein the loading slider includes a thin plate and two friction blocks disposed at opposite sides of the thin plate to contact with the side plates to provide a friction.

5. The lifting device as claimed in claim 4, wherein the at least one constant force spring includes three constant force springs, and the free ends of the three constant force springs overlap each other and are fixed to the sliding member.

6. The lifting device as claimed in claim 1, wherein when the loading slider slides from the highest position to the lowest position, the loading slider provides a pull-down force to the rope fastened thereto, and the rope generates a pull-up force to the sliding member so that the sliding member moves upwardly and stretches the free end of each of the at least one constant force spring.

7. The lifting device as claimed in claim 1, wherein when the loading slider slides from the lowest position to the highest position, the at least one constant force spring pulls the sliding member so that the sliding member provides a pull-down force to the rope fastened thereto.

8. The lifting device as claimed in claim 1, further comprising an upper stop block which is disposed in the frame, adjacent to an upper end of the slide rail, and lower than the pulley to abut against the loading slider.

9. The lifting device as claimed in claim 1, further comprising a lower stop block which is disposed in the frame and adjacent to a lower end of the slide rail to abut against the loading slider.

10. The lifting device as claimed in claim 1, wherein the pulley has a guiding groove for the rope to pass through.

11. The lifting device as claimed in claim 1, wherein a width of the frame parallel to the X direction has a value in a range from 5 mm to 30 mm.

\* \* \* \* \*